United States Patent
Giaramita et al.

(10) Patent No.: US 10,857,616 B2
(45) Date of Patent: Dec. 8, 2020

(54) REFRACTORY ANCHOR SYSTEM

(71) Applicant: J.T. Thorpe & Son, Inc., Richmond, CA (US)

(72) Inventors: Rich Giaramita, Fairfield, CA (US); David Watts, Fairfield, CA (US)

(73) Assignee: JT Thorpe & Sons, Inc., Richmond, CA (US)

( * ) Notice: Subject to any disclaimer, the term of this patent is extended or adjusted under 35 U.S.C. 154(b) by 245 days.

(21) Appl. No.: 15/975,802

(22) Filed: May 10, 2018

(65) Prior Publication Data

US 2018/0345401 A1   Dec. 6, 2018

Related U.S. Application Data

(60) Provisional application No. 62/514,724, filed on Jun. 2, 2017.

(51) Int. Cl.
| | |
|---|---|
| *F27D 1/14* | (2006.01) |
| *F27D 1/16* | (2006.01) |
| *B23K 9/20* | (2006.01) |
| *B23K 9/23* | (2006.01) |
| *B23K 103/04* | (2006.01) |
| *B23K 101/12* | (2006.01) |

(52) U.S. Cl.
CPC .............. *B23K 9/201* (2013.01); *B23K 9/208* (2013.01); *B23K 9/23* (2013.01); *F27D 1/14* (2013.01); *F27D 1/16* (2013.01); *B23K 2101/12* (2018.08); *B23K 2103/05* (2018.08)

(58) Field of Classification Search
CPC ............ F27D 1/141; F27D 1/16; F27D 1/024; F23M 5/04
See application file for complete search history.

(56) References Cited

U.S. PATENT DOCUMENTS

| | | | |
|---|---|---|---|
| 4,651,487 A | 3/1987 | Nishikawa | |
| 4,660,343 A * | 4/1987 | Raycher | B01D 3/326 52/334 |
| 4,711,186 A * | 12/1987 | Chen | B01J 19/0053 110/336 |
| D375,892 S * | 11/1996 | Kraemer, Jr. | D8/384 |
| D393,588 S * | 4/1998 | Tuthill | D8/384 |
| 6,393,789 B1 * | 5/2002 | Lanclos | B04C 5/085 110/338 |
| 7,178,299 B2 | 2/2007 | Hyde et al. | |

(Continued)

OTHER PUBLICATIONS

StudWeldPro-UK. Type 15 Split Y Anchor 2. (2016) Retrieved from https://web.archive.org/web/20160730074846/http://swpuk.com/swp-refractories/refractory-anchors/type-15-split-y-anchor-2/ (Year: 2016).*

*Primary Examiner* — Dana Ross
*Assistant Examiner* — Lawrence H Samuels
(74) *Attorney, Agent, or Firm* — Carissa T. Howard (57) ABSTRACT

A Y-shaped refractory anchor, a plurality of Y-shaped refractory anchors, and a method of installing a plurality of Y-shaped refractory anchors in a hexagonal pattern is disclosed. The Y-shaped refractory anchor comprises a singular folded metal plate comprising a stem that comprises at least one triangular section to be welded to a backing surface and a folded stem base and a branch section comprising two branches, wherein the singular metal plate is folded together at the stem base, such that the stem of the Y-shaped anchor is twice as thick as the two individual branches.

12 Claims, 11 Drawing Sheets

(56) References Cited

U.S. PATENT DOCUMENTS

| | | | |
|---|---|---|---|
| 8,656,679 B1 | 2/2014 | Duhon | |
| 9,279,245 B2 | 3/2016 | Garot | |
| 9,861,949 B2 | 1/2018 | Simon et al. | |
| 10,508,861 B1 * | 12/2019 | D'Oracio De Almeida | F23M 5/04 |
| D872,569 S * | 1/2020 | D'Oracio De Almeida | D8/384 |
| 2004/0226251 A1 * | 11/2004 | Hyde | E04F 15/06 52/674 |
| 2015/0147236 A1 * | 5/2015 | Simon | B01J 8/1872 422/143 |
| 2015/0267122 A1 * | 9/2015 | Hinson | C10B 39/06 208/131 |
| 2016/0047124 A1 | 2/2016 | Garot et al. | |
| 2017/0321962 A1 * | 11/2017 | Decker | B32B 3/12 |
| 2018/0320973 A1 * | 11/2018 | Yoder | B01J 19/02 |
| 2020/0049408 A1 * | 2/2020 | D'Oracio De Almeida | F27D 1/142 |

\* cited by examiner

REFRACTORY ANCHOR SYSTEM

CROSS-REFERENCE TO RELATED APPLICATIONS

The present application claims priority to U.S. Provisional Application No. 62/514,724 "Refractory Anchor System," filed on Jun. 2, 2017, which is herein incorporated by reference in its entirety.

BACKGROUND OF THE INVENTION

Refractory anchors and related materials are used for anchoring and assembling refractory materials, including refractory ceramic fiber linings or for reinforcing monolithic linings of castables, plastics or ramming mixes. Anchors and anchor systems are generally affixed or welded, to a backing surface or plate, such as a wall or surface of a vessel or other piece of equipment, and are used to hold refractory material.

Refractory anchors are typically welded to a metal surface. Anchors may be made of steel or any other suitable metallic material or alloy. Anchors may form a pattern on the backing material. The patterns are important to uniformly hold refractory material in place and for heat transfer. Once the anchors are in place, refractory material may be applied or installed in any suitable manner.

Refractory anchors are found in many shapes including, studs, V-clips, C-clips, and miscellaneous parts.

One commonly used hexagonal anchor system is hexagonal cells, or simply, hex cells, as they are referred to in the industry. Hex cells are specified for newly fabricated parts in a shop environment. They are used extensively for field relines and maintenance. Each individual hex cell is independently anchored, meaning that it is independently affixed to a backing material, usually by welding, such as stick welding.

Examples of conventional anchors and systems include those described in the following patented anchors and anchor systems. Simon et al. (U.S. Pat. No. 9,861,949 B2) discloses a process for producing an anti-erosion coating on an inner or outer metal wall of a chamber of a fluid catalytic cracking unit, comprising the shaping of a honeycomb metal anchoring structure. Duhon (U.S. Pat. No. 8,656,679 B1) discloses an interconnectable refractory anchor for receiving refractory lining material. Hyde et al. (U.S. Pat. No. 7,178,299 B2) discloses tiles composed of a plurality of anchors. Lanclos (U.S. Pat. No. 6,393,789 B1) discloses an anchor made by combining two similar sections that are clinched together to form an elongated X-shape. Chen et al. (U.S. Pat. No. 4,711,186 A) discloses an anchor used to retain thin refractory linings. Nishikawa (U.S. 4,651,487 A) discloses a wear-resistant refractory lining anchor and interconnected system.

Examples of conventional commercially available anchors and systems include those available from Kalpataru Metal & Alloys (India), Hebei Feirui Trade Co., Ltd. (China), and Granden Hex Steel Company (US).

Garot (U.S. Pat. No. 9,279,245 B2) and Garot et al. (US Patent Publication No. US 2016/0047124) describe anchoring assemblies. The Garot et al. Publication describes an anchoring assembly comprising a plurality of spaced anchor fins connected to an elongated mounting pin that extends radially outward relative to the pin.

Anchor systems of the prior art include large sheets of honeycombed series of integral hexagonal metal anchors, known as hex mesh. These sheets have to be rolled by mechanical rolling equipment, cut to size and shape and then installed. Typically, these prior art systems are cumbersome to fabricate, roll and install. The prior art systems are bulky and difficult to cut and shape into curved or nonuniform geometries.

There is a need for a refractory anchor system that is designed as a single equilateral leg fabricated steel Y-shaped anchor that can be installed to create a hexagonal pattern that requires only a single, easy and repeatable weld in its installation.

SUMMARY OF THE INVENTION

In the present invention, a folded metal plate is formed into a Y-shaped anchor to be affixed to a metal surface. The metal plate is folded at the base of the stem of the Y-shape, making it twice as thick in the stem of the Y as it is in the branches of the Y-shape. The stem of the Y comprises at least one triangular section to be welded to the metal surface, preferably stud welded. The branches of the Y-shape are not welded and each branch may have one or more voids (holes) and tabs (fins). The voids and tabs help the refractory material adhere to the anchor and thus the metal surface. Each individually folded metal plate Y-shaped anchor may be installed into a series of similar Y-shaped anchors that form a hexagonal pattern on the metal surface.

The present invention also involves a process of installing a plurality of Y-shaped anchors onto a backing surface.

The dimensions of the folded metal plate and the series of Y-shaped anchors placed into a hexagonal pattern are depicted in the drawings.

DETAILED DESCRIPTION OF THE INVENTION

In one embodiment of the invention, a metal plate is folded to form a Y-shaped anchor.

In one embodiment of the invention, the Y-shaped anchors create an alternative hexagonal system. The "alternative" refers to another alternative from fully formed steel hexagonal sheets of the prior art.

In one embodiment of the invention, a pattern of Y-shaped anchors creates a deconstructed hexagonal system. The "deconstructed" means that the hexagonal shape has been reduced to its constituent parts in order to reinterpret it. The hexagonal shapes are formed from individual anchors as compared to fully formed steel hexagonal sheets of the prior art.

In one embodiment of the invention, the stem of the Y is welded to the backing material or the side of a vessel or piece of equipment. In this embodiment, the branches of the Y are not welded. One method of welding is stud welding.

In the present invention, failure of one weld does not affect the entire system.

In the present invention, cumbersome sheets of metal hexagonal shapes do not need to be welded into place.

In the present invention, cumbersome sheets of anchor systems do not need to be rolled or cut to fit onto a specific geometry or surface.

In one embodiment of the present invention, a folded metal plate is formed into a Y-shaped anchor to be affixed to a metal surface. The metal plate is folded at the base of the stem of the Y-shape, making it twice as thick in the stem of the Y as it is in the branches of the Y-shape. The stem of the Y comprises at least one section to be welded to the metal surface, preferably stud welded. The section to be welded is also called a foot. The foot has two tapered edges and a flattened edge to be welded to a backing surface. The branches of the Y-shape are not welded and each branch has a single void (hole) and a single tab (fin). The voids and tabs help the refractory material adhere to the anchor and thus the metal surface. Each individually folded metal plate Y-shaped anchor may be placed into a series of similar Y-shaped anchors that form a hexagonal pattern on the metal surface. The backing surface may be the inside of a fluid catalytic cracking unit or other suitable unit known in the art.

Figure 1:
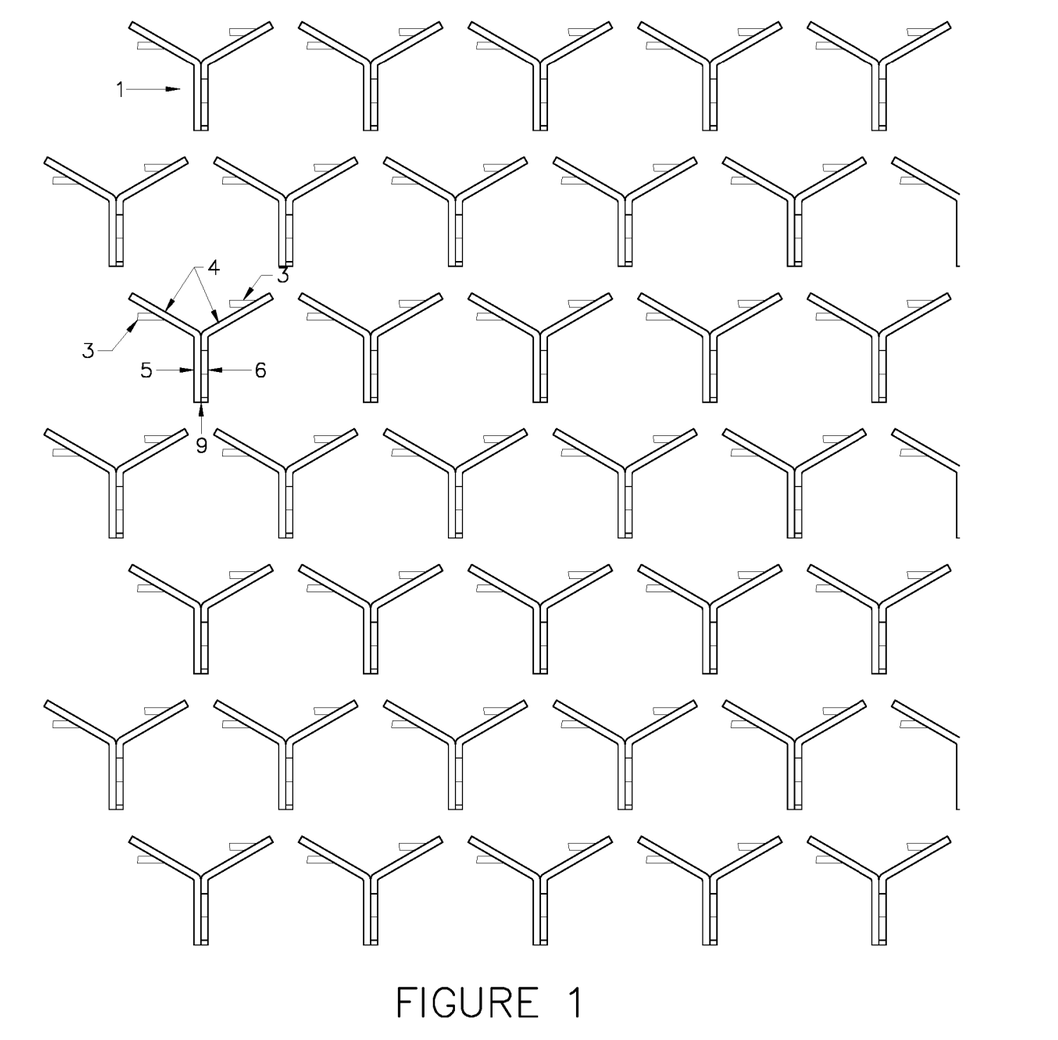
FIG. 1 shows a series of Y-shaped anchors placed into a hexagonal pattern.

FIG. 1 shows a series of Y-shaped anchors placed into a hexagonal pattern. A plurality of Y-shaped anchors 1 are installed equidistant apart in a row. A second plurality of Y-shaped anchors 1 are installed equidistant apart in a second row. The rows of Y-shaped anchors 1 are installed so that they are staggered forming the suggested hexagonal pattern. The Y-shaped anchor 1 includes the branches 4 of the Y and the stem 5 of the Y. Each branch 4 may have a single void (hole) and a single tab (fin) 3. Multiple holes and fins create additional surface area in which to engage the refractory material. The stem 5 has base 9. In FIG. 1, the stem 5 has a single foot 6 that is welded. The branches 4 of the Y-shaped anchor 1 are not welded.

Figure 2:
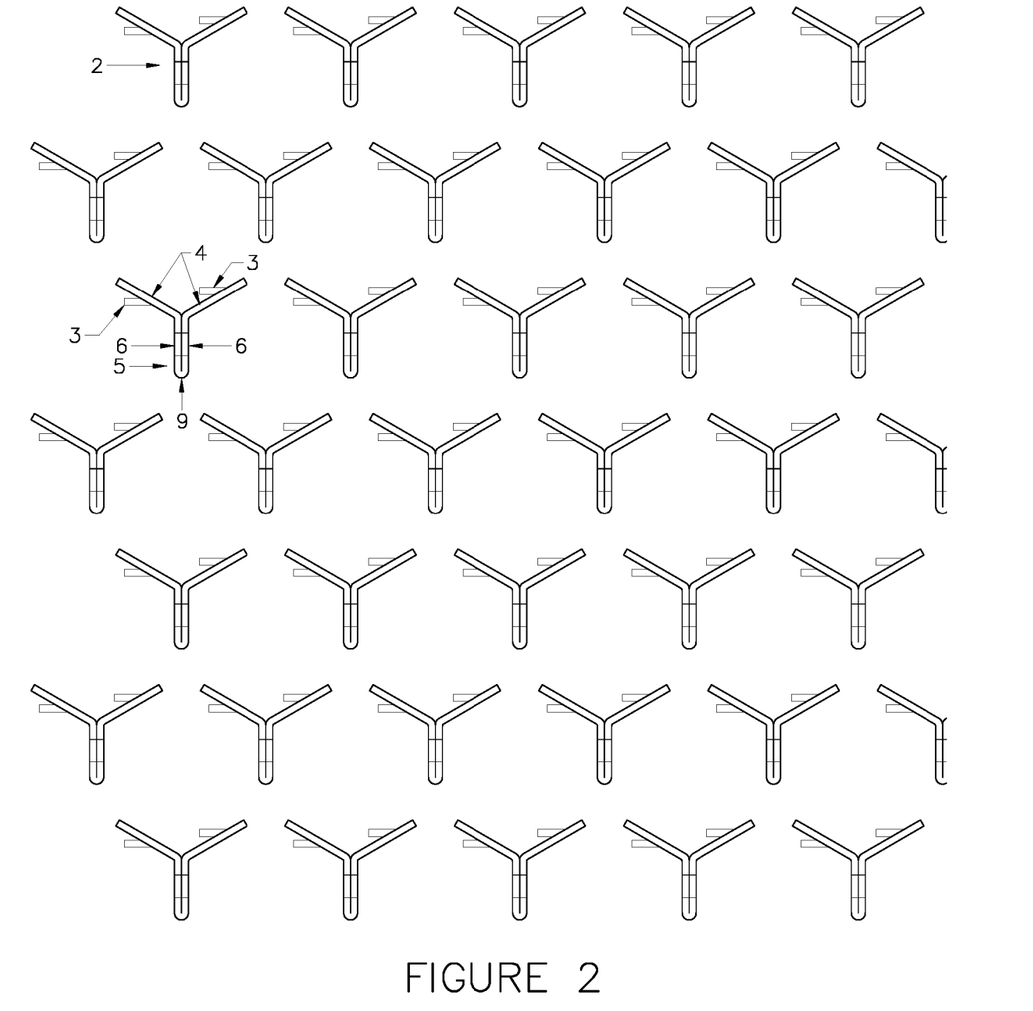
FIG. 2 shows a series of Y-shaped anchors placed into a hexagonal pattern.

The Y-shaped anchor of the present invention is Y-shaped before welding or installation. The Y-shaped anchor of the present invention is also Y-shaped after welding onto the backing surface. The Y-shaped anchor 1 is welded at the foot 6 so that the Y-shape is still visible on the backing surface once the Y-shaped anchor is attached to the backing surface. The orientation of the Y-shaped anchors along the backing surface of the unit to be lined with refractory is important to make the hexagonal pattern as seen in FIGS. 1 and 2. The branches of the Y-shaped anchor lay along (parallel to) the surface of the backing surface. In other words, the Y-shaped anchor 1 is not attached to the backing surface so that the branches extend into the empty space of the unit away from (perpendicular to) the backing surface.

FIG. 2 shows a series of Y-shaped anchors placed into a hexagonal pattern. Like FIG. 1, FIG. 2 shows the staggering of the rows of Y anchors 2 forming the hexagonal pattern. The Y-shaped anchor 2 includes the branches 4 of the Y and the stem 5 of the Y. In FIG. 2, each branch 4 of the Y anchor 2 has a single void (hole) and a single tab (fin) 3. FIG. 2 shows an embodiment of the Y anchors 2 that have two feet 6 in the stem 5. The stem 5 has base 9. The branches 4 of the Y-shaped anchor 2 are not welded.

The Y-shape anchors are repeatedly installed along the backing material or surface in a row. See FIGS. 1 and 2 as examples. For the second row, underneath the first row, the Y-shaped anchors are offset, and are placed in between, directly in the middle of, the Y-shaped anchors of the first row. The resulting pattern results in the two rows of Y-shaped anchors forming multiple hexagonal shapes on the backing material.

The Y-shaped anchors may not directly touch each other to form a closed hexagon.

In one embodiment of the invention, the hexagons are merely suggested by the offset rows of Y-shaped anchors. In one embodiment of the invention, the Y-shaped anchors are spaced apart from each other as depicted in FIGS. 1 and 2.

In one embodiment of the invention, there about 33 Y-shaped anchors per square foot of the backing material.

In one embodiment of the invention, the Y anchors 1 or 2 are spaced about 2.25 inches apart, measuring from the base 9 of stem 5 to base 9 of stem 5 along the same row.

In one embodiment of the invention, the Y anchors 1 or 2 are spaced about 1.75 inches apart, measuring from the base 9 of stem 5 to base 9 stem 5 from one row to another.

In one embodiment of the invention, the stem 5 is about 0.9 inches in length.

In one embodiment of the invention, the branches 4 are about one inch in length.

In one embodiment of the invention, the Y anchor 1 or 2 is about 0.75 inches deep after installation. In another embodiment, the Y anchor 1 or 2 is about 1 inch deep after installation. The depth of the Y anchor 1 or 2 is designed for the industry standards for thickness of erosion resistant linings.

The offset staggered layout of the Y-shaped anchors shown in FIGS. 1 and 2 afford maximum uniform distribution of the refractory, with minimal areas of proximate refractory anchors, and thus maximum refractory area coverage.

In one embodiment of the present invention, the dimensions of the folded metal plate Y-shaped anchor 1 or 2 provide optimal support of a one-inch layer of refractory, a common thickness of refractory application. The dimensions illustrated in some of the Figures are used with 1" layer of refractory. Additionally, a layer of ¾" refractory may be suitable for certain refractory applications. The dimensions illustrated in some of the Figures can be easily adjusted to be used with ¾" layer of refractory or other known or used thicknesses.

FIG. 3A-3E shows details of a folded metal plate forming a Y-shaped anchor.

Figure 3A:
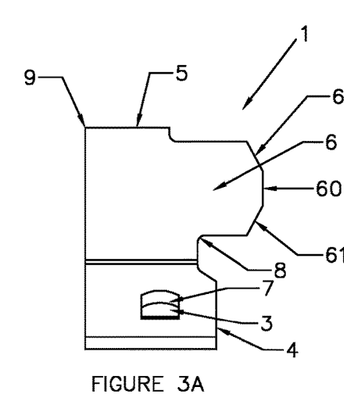
FIG. 3A-3E shows details of a folded metal plate forming a Y-shaped anchor.
Figure 3B:
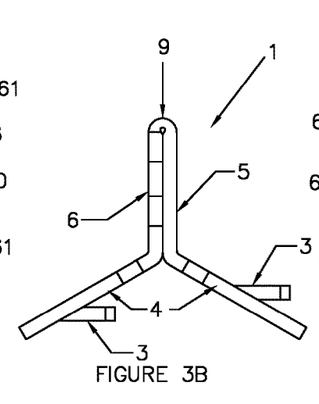
Figure 3C:
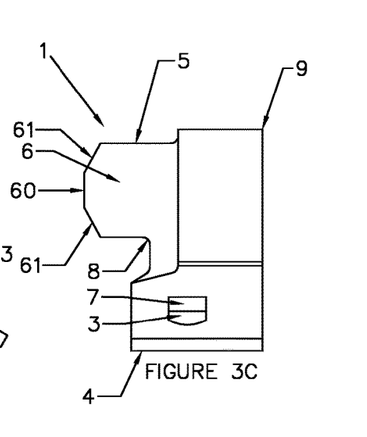
Figure 3D:
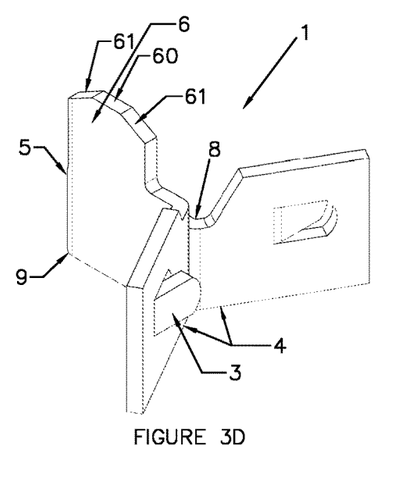
Figure 3E:
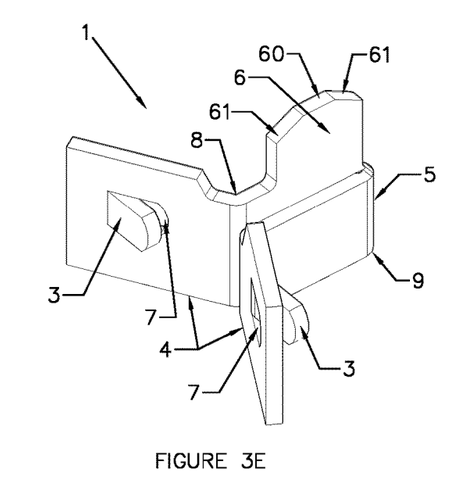

FIG. 3A is a side view of the Y-shaped anchor 1. FIG. 3B is the top view of the Y-shaped anchor 1. FIG. 3C is the other side view of the Y-shaped anchor 1. FIGS. 3D-3E are 3-dimensional perspective drawings of Y-shaped anchor 1.

The Y-shaped anchor 1 preferably has 120 degree angles between the stem and branch and in between the two branches. See FIG. 3B. The stem 5 of the Y is preferably about ⅞ of an inch long and the length of each branch 4 is preferably one inch. The triangular section 6 of the stem to be welded is preferably 12 gauge.

Each branch 4 of the angled metal plates has an anchorage hole or void 7 as shown in FIG. 3. Additionally, each branch 4 of the angled metal plate has an anchorage tab or lance or fin 3. The voids 7 shown in FIG. 3 are about 0.25 inch long. Both of the anchorage fins 3 point in the same horizontal direction. The voids 7 and fins 3 create additional surface area for which to hold the refractory material in place. The void is created in each angled metal plate by punching out the fins, such as by punch pressing. It is noted that all anchorage fins and anchorage voids may be formed by any comparable method of formation, including casting, cutting, and other methods known in the art.

The stem 5 of the Y anchor is to be welded to the backing surface, such as by stud welding. The stem 5 of the folded metal plate has a triangular section 6 that is to be welded to the backing surface, also known as the foot 6. The tip of the triangular section 6 has flattened edge 60. The edge 60 that is sheered down to create slighted tapered edges 61. The relative scale and angles of these edges 60 and 61 can be seen in FIG. 3. The sheering of the edges 61 makes the foot 6 have a suggested triangular shape along the edges 60 and 61. The flattened edge 60 is pressed and welded into the backing plate or metal surface. The stud gun holds the Y-shaped anchor in place. With the tip of the triangular flattened edge 60 pressed against the backing plate, the stud gun releases an electric charge that melts the triangular tip of the foot 6 (the edges 60 and 61) forming the weld joint between the anchor and the backing plate or metal surface. Current, voltage, and timing of the stud gun and its settings are known in the art and are adjustable accordingly.

The triangular section 6 to be welded is tapered down to maximize metal arc flow in the stud welding process. The Y-shaped anchor is clamped into a stud welding chuck, and then welded on a cleaned area of the surface to be protected.

Stud welding is generally known in the industry as a simple, not highly skilled weld. Therefore, by utilizing stud welding, the process of installing multiple Y anchors is repeatable and predictable.

The folded Y-shaped anchor 1 shown in FIG. 3 also has a notch 8 that separates the stem 5 of the Y with the two individual branches 4. This notch 8 may be seen in each of FIGS. 3A, 3B, 3C, and 3D.

The Y-shaped anchor is folded at the base 9 of the stem. This base 9 of the stem is at the midpoint of the length of the metal plate. The base 9 of the stem is not to be affixed to the backing surface. Instead, the welding is along edge 60 of the foot 6.

Figure 4A:
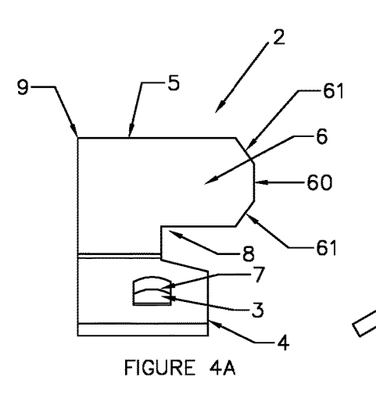
FIG. 4A-4E shows details of a folded metal plate forming a Y-shaped anchor.
Figure 4B:
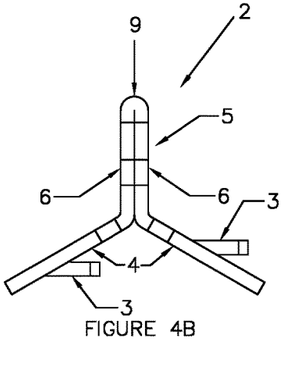
Figure 4C:
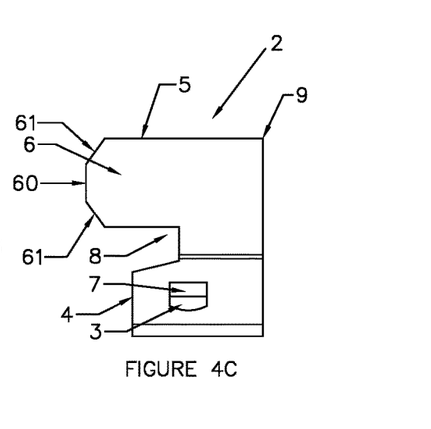
Figure 4D:
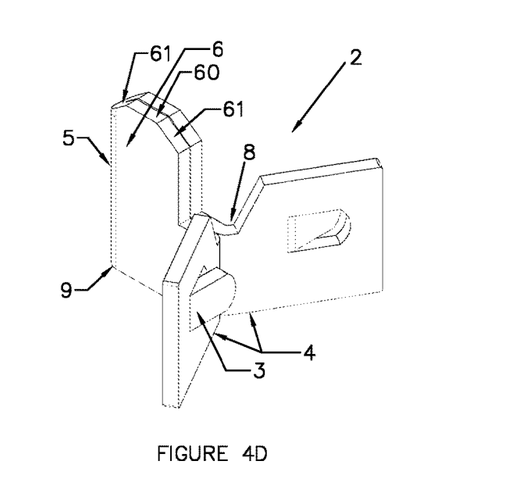
Figure 4E:
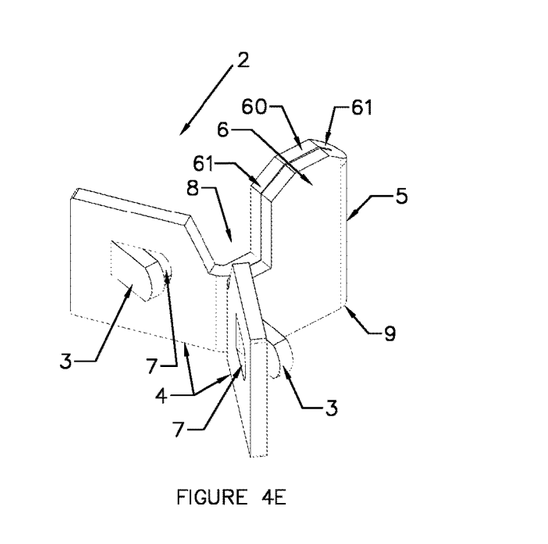

FIG. 4A-4E shows details of a folded metal plate forming a Y-shaped anchor. Similar to FIGS. 3A-4E, FIGS. 4A-4E shows a Y-shaped anchor 2 according to an embodiment of the invention. The Y-shaped anchor 2 of FIG. 4 has two triangular sections 6 to be welded. FIG. 4A is a side view of the Y-shaped anchor 2. FIG. 4B is the top view of the Y-shaped anchor 2. FIG. 4C is the other side view of the Y-shaped anchor 2. FIGS. 4D-4E are 3-dimensional perspective drawings of Y-shaped anchor 2.

FIG. 4 shows a Y-shaped anchor 2 with a stem 5, notch 8, and two branches 4, with the branches 4 having fins 3, and voids 7. The dimensions of the Y-shaped anchor 2 are similar to the dimensions of the Y-shaped anchor 1 of FIG. 3.

Some applications may desire two triangular sections 6 to be welded in the Y-shaped anchor 2. The actual foot or portion of the anchor welded 6 is double the thickness in Y anchor 2 than in Y anchor 1. The two feet 6 provides a more robust weld as the amount of material welded together is increased twofold. However, the welding of the Y-shaped anchor 2 requires twice the power in the welding equipment. Some applications may desire only the singular triangular section 6 to be welded as discussed in FIG. 3. Practically speaking, having the Y-shaped anchor that has either one or two feet 6, allows for variations in the installation depending on equipment and desired strength of weld. For example, a single foot 6 in the Y-shaped anchor 1 may require about 700 amps per weld. In a double foot 6 Y-shaped anchor 2, about 1400 amps may be needed for each weld.

Figure 5:
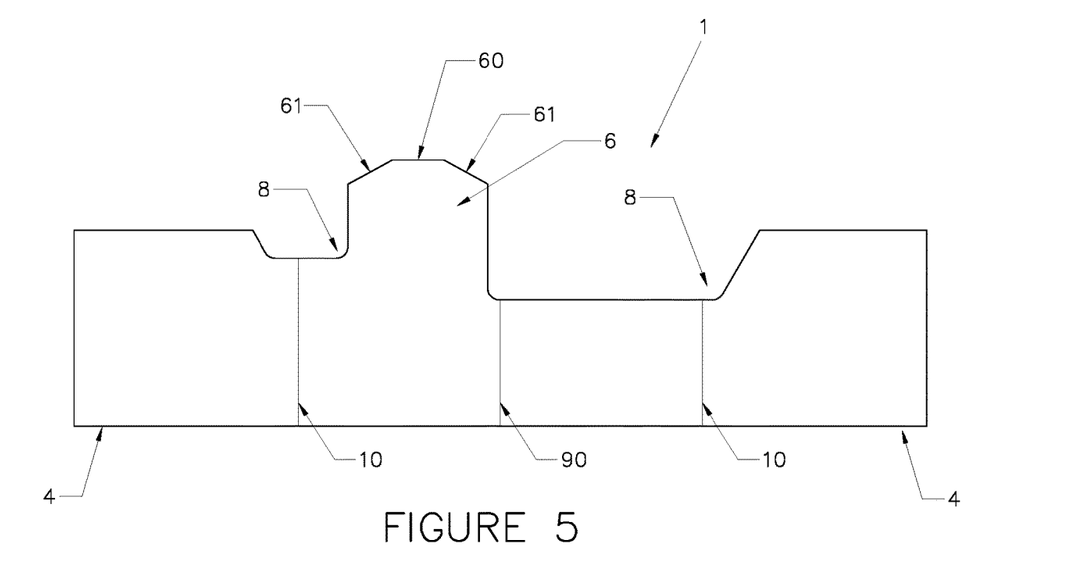
FIG. 5 shows a metal plate before it is folded into a Y-shaped anchor.

FIG. 5 shows a metal plate before it is folded into a Y-shaped anchor. FIG. 5 illustrates the Y-shaped anchor 1 having one triangular section, the foot 6.

The relative dimensions of the metal plate to be folded into the Y-shaped anchor are depicted in the scale drawings. Specifically, as shown in FIG. 5. The notch 8 is seen at the two outer bend lines 10 depicted in FIG. 5.

First, the metal plate of the present invention is formed from any suitable casting or fabrication process. The two ends of the metal plate may be punch pressed to create the fins and voids. The fins on the branches of the Y-shaped anchor may be punched so that they point in the same direction. Next, the metal plate is folded into the Y-shape, utilizing the bend line 90 depicted in FIG. 5. Then the folded metal plate is held in the middle (the stem of the Y) and the two branches 4 of the Y are spread apart to a 120 degree angle to form the Y-shaped anchor 1. The two bend lines 10 show where the branches 4 are to begin. The fins and voids may be punched or stamped into the Y branches 4 before or after the metal plate is folded.

There are three bend lines depicted in FIG. 5. The metal plate is folded at its midpoint, which is the middle 90 of the three bend lines depicted in FIG. 3. The stem of the Y-shape thus extends from the first of the bend lines 10 to the third of the bend lines 10 depicted in FIG. 5. The triangular shaped section 6 of the stem to be welded is depicted in detail in FIG. 5. There are also notches 8 in the metal plate which receive a ceramic ferrule.

The Y-shaped anchor 1 is not affixed to the backing surface at stem base 9 along the folding line 90. Instead, it is affixed to the backing surface along line 60 depicted in FIGS. 3 and 5.

The metal plate is folded together to form the stem of the Y-shape by any suitable method of fabricating steel known in the art. The forces of the fold keep the two sides of the stems in physical contact with each other. Additionally, once folded, the two parts of the stem may be affixed together by welding, crimping, coupling, such as by a full penetration weld.

Figure 6:
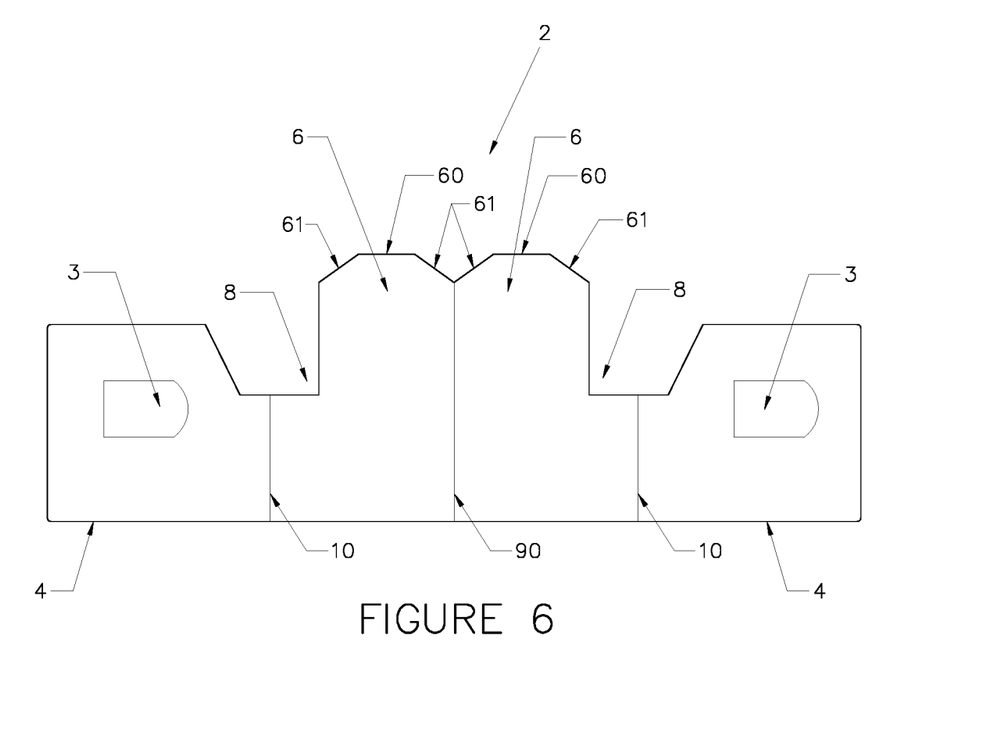
FIG. 6 shows a metal plate before it is folded into a Y-shaped anchor.

FIG. 6 shows a metal plate before it is folded into a Y-shaped anchor. Compared to FIG. 5, FIG. 6 shows the metal plate before it is folded into a Y-shaped anchor 2, which has two feet 6 to be welded. FIG. 6 shows the center fold line 90, where the metal plate is folded in half. The two bend lines 10 show where the branches 4 are to begin. The two branches 4 of the Y are spread apart to a 120 degree angle to form the Y-shaped anchor 2 at bend lines 10. Also visible in FIG. 6 are the notches 8 which will receive the ceramic ferrule shown in FIG. 7. The beginnings of the fins 3 of the branches 4 of the Y-shaped anchor 2 are also visible in FIG. 6. The fins 3 will be punched out before or after the folding along folding line 90.

The Y-shaped anchor 2 is not affixed to the backing surface at stem base 9 along the folding line 90. Instead, it is affixed to the backing surface along line 60 depicted in FIGS. 4 and 6.

Figures 7A, 7B, 7C, 7D, 7E:
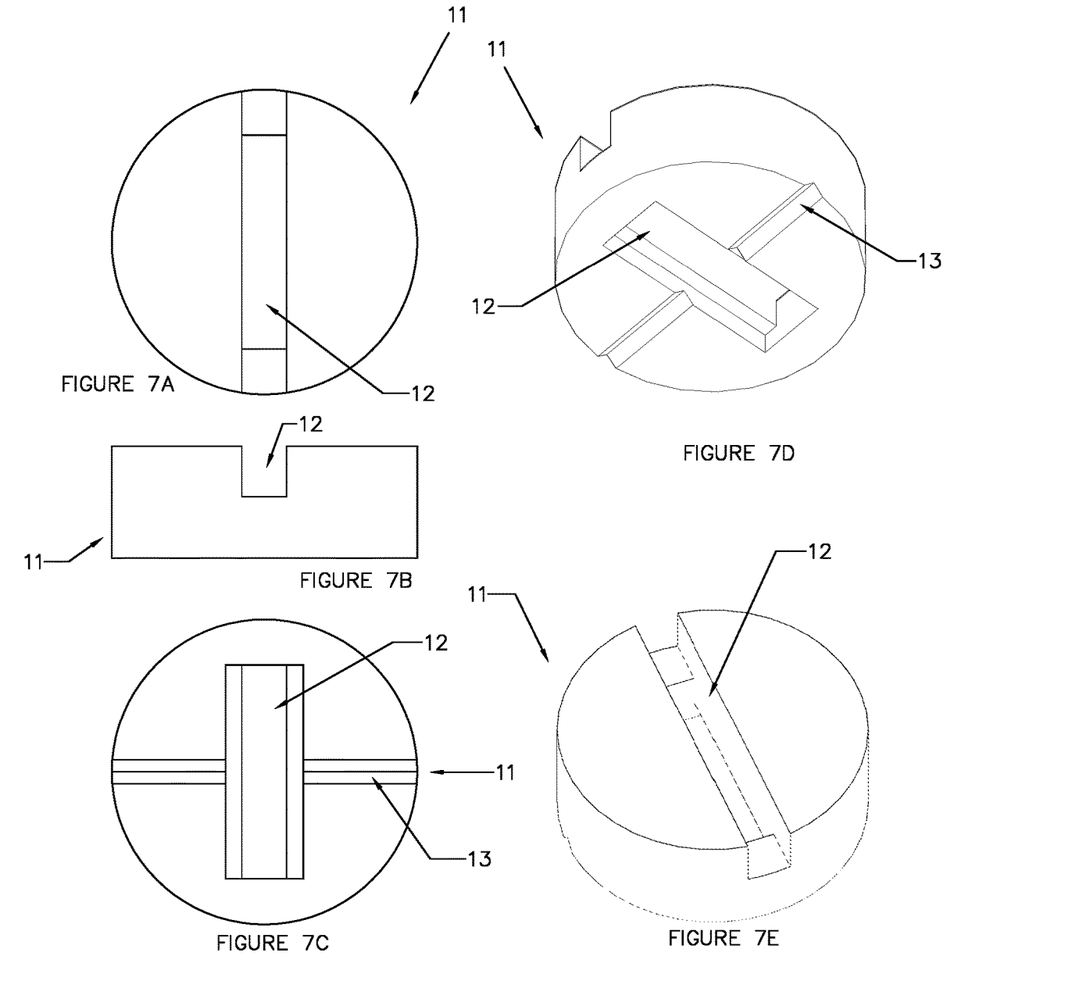
FIG. 7A-7E shows the ceramic ferrule used in installing anchors according to one process of the present invention.

FIGS. 7A-7E show the ceramic ferrule 11 used in installing anchors according to one process of the present invention. FIG. 7A is the view of the top surface of the ceramic ferrule 11. FIG. 7B is the side view of the ceramic ferrule 11. FIG. 7C is the view of the bottom surface of the ceramic ferrule 11. FIG. 7D is a three-dimensional view of the bottom of the ceramic ferrule 11. FIG. 7E is a three-dimensional view of the top of the ceramic ferrule 11. The top surface of the ceramic ferrule 11 receives the Y-shaped anchor. The bottom surface of the ceramic ferrule 11 engages the backing surface to which the anchor is being applied.

Another embodiment of the present invention is the ceramic ferrule 11 of FIG. 7. As shown, it is cylindrical in shape and has a rectangular slot 12 for receiving the triangular section of the anchor to be welded. The ceramic ferrule 11 is positioned around the anchor in the welding process. It is positioned against the backing surface to which the anchor is being applied. This ceramic ferrule is disposable and meant to be removed before refractory material is applied to the anchor system.

In one embodiment, the ceramic ferrule 11 has a perpendicular rectangular slot 13 on its bottom side. Rectangular slot 13 is perpendicular to the rectangular slot 12 for receiving the triangular section 6 of the anchor to be welded. It is helpful in brining air to the weld. Other variations in the ceramic ferrule are known in the art and are useful in the present invention. The top side of the ceramic ferrule 11, as seen in FIGS. 7A and 7E may be smooth, porous, or may have additional grooving or other suitable texture.

In one embodiment of the present invention, a ceramic ferrule depicted in FIG. 7A-7E is used in connection with the stud gun in installing the anchors. The ceramic ferrule fits around the Y-shaped anchor at the triangular edge to be welded. The notch 8 that is on the edge of the Y-shaped anchor 1 or 2 receives the ceramic ferrule. The dimensions of the ceramic ferrule may be the ones depicted in FIGS. 7A-7E and any suitable variation as known in the art. The ceramic ferrules are disposable. After the anchor is welded to the backing surface, it may be removed, such as by hammering or otherwise physically breaking it off the backing surface. Ferrules are generally removed before the refractory is applied.

Figure 8:
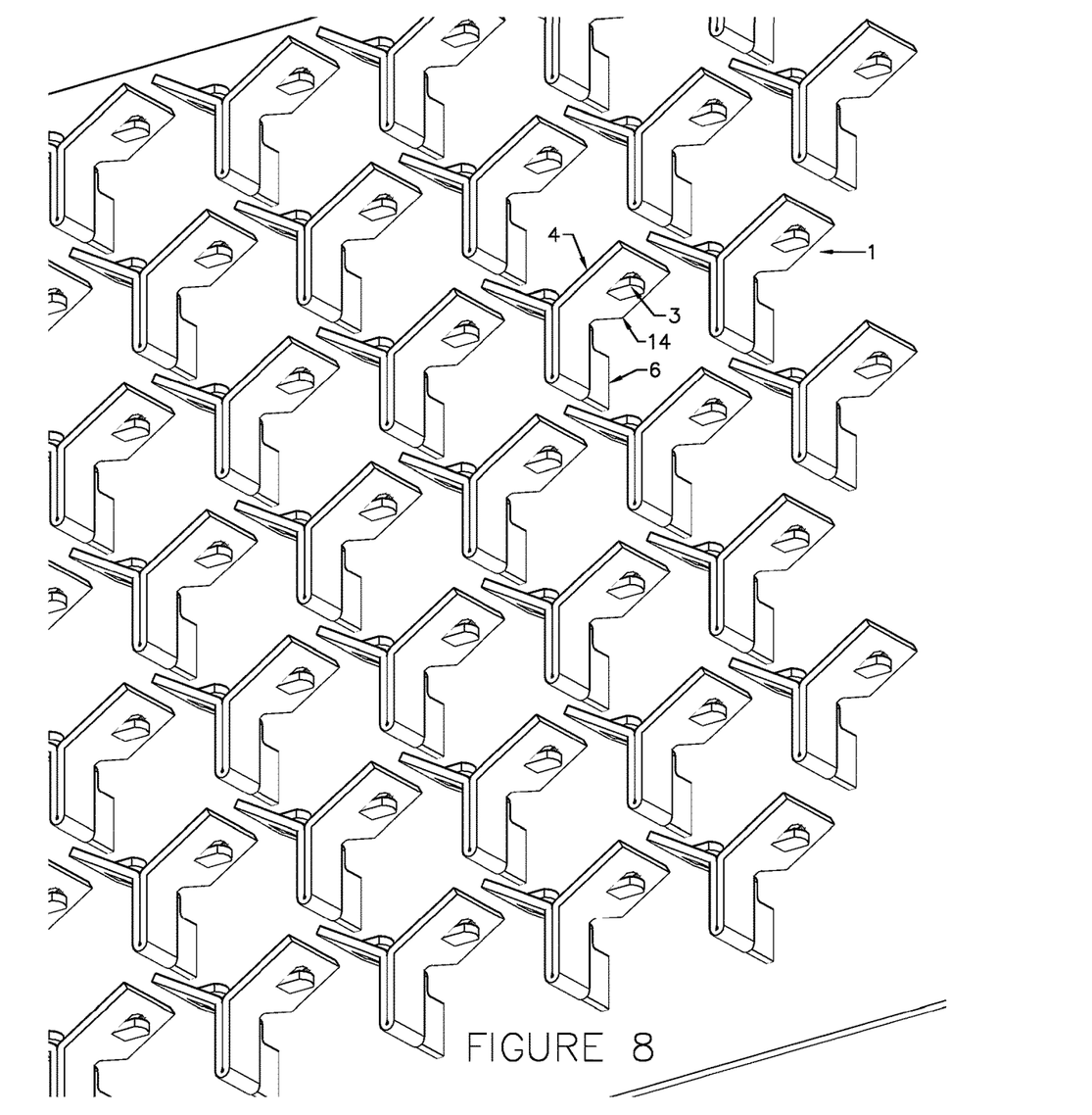
FIG. 8 shows an installed series of Y-shaped anchors placed into a hexagonal pattern.

FIG. 8 shows an installed series of Y-shaped anchors placed into a hexagonal pattern. FIG. 8 illustrates the Y-shaped anchor 1 having one foot 6.

Figure 9:
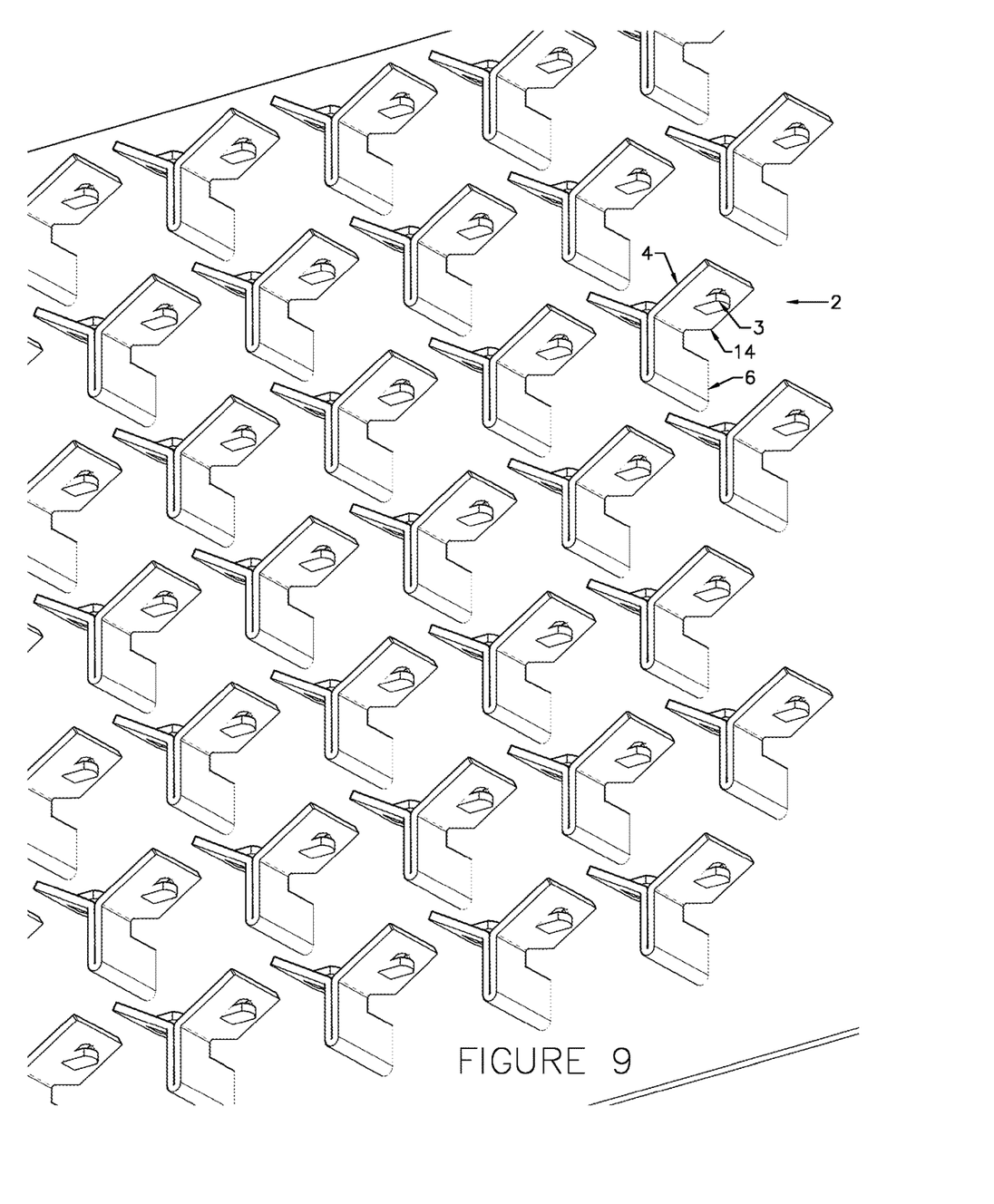
FIG. 9 shows an installed series of Y-shaped anchors placed into a hexagonal pattern.

FIG. 9 shows an installed series of Y-shaped anchors placed into a hexagonal pattern. FIG. 9 illustrates the Y-shaped anchor 2 having two feet 6.

Once the ferrule is removed, there is a gap created by the virtue of the weld between the Y-shaped anchor and the backing surface. This gap 14 is best seen in FIGS. 8 and 9. In a preferred embodiment, this gap is about ⅛ of an inch. This ⅛ inch gap results from a portion of the triangular section of the Y-shaped anchor being burned off in the process of welding. Because the depth of the Y-shaped anchor is about ⅞ of an inch and the ⅛ gap 14, the system can hold about one inch of refractory material.

The anchor of the present invention may be welded on a clean brushed area of the surface to be protected using standard welding techniques known in the art. Each refractory anchor is manually positioned such that the triangular section of the foot is in contact with the surface to be protected, and using a stud gun and ceramic ferrule, it is held in place and then welded. One way to space the Y-shaped anchor in this pattern is to utilize a spacer to be attached to the stud gun. Another way to space the Y-shaped anchor is by manually measuring the distance and marking the backing surface as known in the art.

Figure 10:
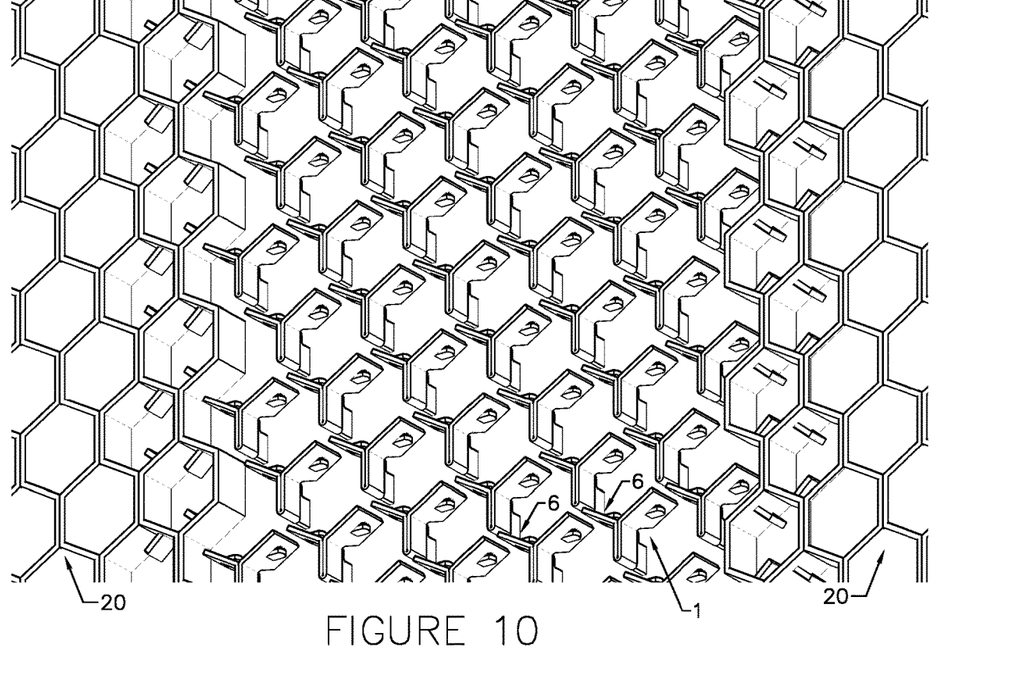
FIG. 10 shows an installed series of Y-shaped anchors placed into a hexagonal pattern.

FIG. 10 shows an installed series of Y-shaped anchors placed into a hexagonal pattern. FIG. 10 illustrates the Y-shaped anchor 1 having one foot 6.

Figure 11:
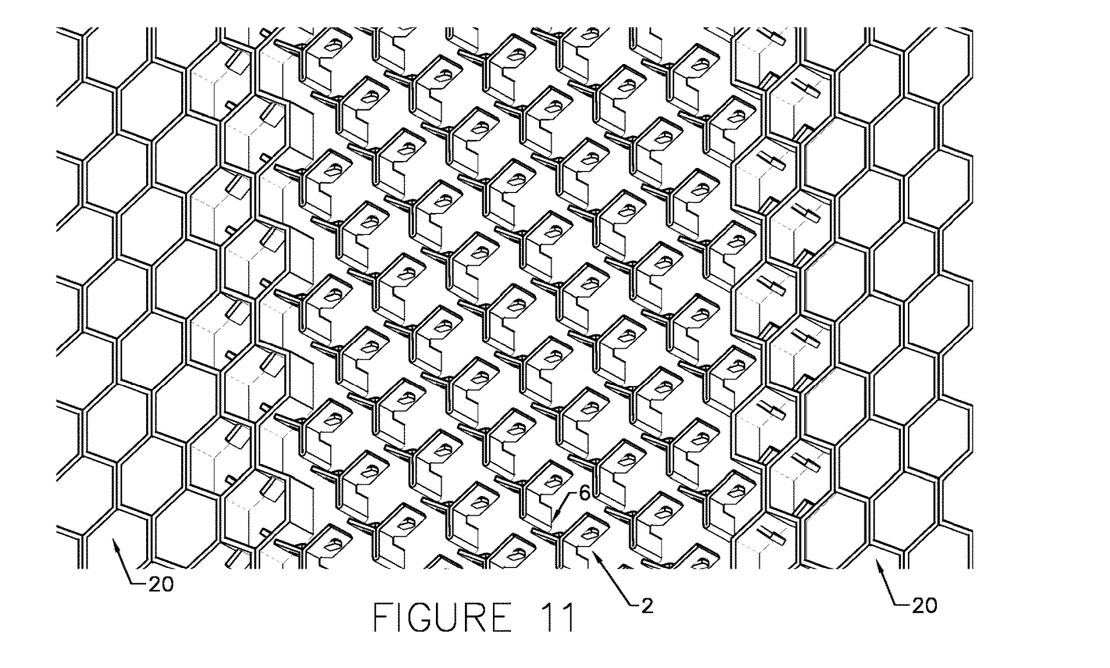
FIG. 11 shows an installed series of Y-shaped anchors placed into a hexagonal pattern.

FIG. 11 shows an installed series of Y-shaped anchors placed into a hexagonal pattern. FIG. 11 illustrates the Y-shaped anchor 2 having two feet 6.

Installing the anchors of the present invention among existing hexagonal anchoring systems 20 of the prior art is seen in FIGS. 10 and 11. Thus, the system of the present invention may be retrofitted into existing hexagonal patterns of the prior art 20. The system of the present invention is useful in maintenance, repairs, and new construction.

The Y-shaped anchors may not touch each other during installation because of the stud welding process. Each individual Y-shaped anchor should only be stud welded (come in contact with the electric charge of the stud gun) once. If one Y-shaped anchor is already affixed to the backing surface and it is touching another Y-shaped anchor being welded, the second weld may affect the first Y-shaped anchor's weld/adherence to the backing surface. Therefore, the spacing that is depicted in FIGS. 1 and 2 ensures that the Y-shaped anchors only come in contact with a stud gun stud once in the installation process.

In one embodiment of the invention, a series of Y-shaped anchors create the multiple hexagonal shapes.

The hex anchor system of the present invention may be used in new construction or in maintenance and repairs. The hex anchor system of the present invention may be used in many different geometries. It can be affixed to a flat or curved surface. It can be applied to corners. It can be fitted into existing areas such as seen in FIGS. 10 and 11.

In one embodiment of the invention, the series of off-set Y-shaped anchors create uniform or near-uniform heat transfer.

In one embodiment of the present invention, the folded metal plate is constructed of 12-gauge type stainless steel. The stem of the Y-shaped anchor thus has twice the thickness of the branches of the Y. 14-gauge stainless steel may also be used.

The drawings are for illustration purposes only. The invention is not limited to the exemplary dimensions depicted in the drawings. Other dimensions and embodiments are herein included in the present invention.

What is claimed is:

1. A system of refractory anchors comprising: a plurality of Y-shaped anchors, wherein each Y-shaped anchor of the plurality of Y-shaped anchors comprises a singular rectangular folded metal plate comprising a stem to be welded to a backing surface along a flat back edge of the stem and a branch section comprising two individual branches, wherein the two individual branches create an obtuse angle and wherein the two individual branches have a flat back edge, wherein the singular metal plate is folded together at a stem base, such that the stem of the Y-shaped anchor is twice as thick as the two individual branches, wherein the stem of the Y-shaped anchor has at least one tapered triangular section located on the back edge of the folded stem to be welded to the backing surface, wherein the at least one tapered triangular section is designed to create a gap in between the back flat edge of the two individual branches and the backing surface upon welding the Y-shaped anchor to the backing surface, wherein the plurality of Y-shaped anchors are arranged to make a hexagonal-shaped pattern between the plurality of Y-shaped anchors on the backing surface, and wherein none of the plurality of Y-shaped anchors touch another of the plurality of Y-shaped anchors.

2. The system of claim 1, wherein the two individual branches of each Y-shaped anchor comprise one void and one tab each.

3. The system of claim 1, wherein the stem of the Y-shaped anchors has two tapered triangular sections to be welded to the backing surface.

4. The system of claim 1, wherein the two individual branches are each one inch in length.

5. The system of claim 1, wherein the stem is 0.9 inch in length.

6. A process of applying a plurality of Y-shaped anchors to a backing surface comprising: bringing a Y-shaped anchor of the plurality of Y-shaped anchors, wherein each Y-shaped anchor of the plurality of Y-shaped anchors comprises a singular rectangular folded metal plate comprising a stem to be welded to a backing surface along a flat back edge of the stem and a branch section comprising two individual branches, wherein the two individual branches create an obtuse angle and wherein the two individual branches have a flat back edge, wherein the singular metal plate is folded together at a stem base, such that the stem of the Y-shaped anchor is twice as thick as the two individual branches, wherein the stem of the Y-shaped anchor has at least one tapered triangular section located on the back edge of the folded stem, to be welded in contact with a backing surface wherein the at least one tapered triangular section is designed to create a gap in between the back flat edge of the two individual branches and the backing surface upon welding the Y-shaped anchor to the backing surface; stud welding the at least one triangular section to the backing surface; and repeating the bringing in contact and stud welding steps so that the plurality of Y-shaped anchors are arranged to make a hexagonal-shaped pattern between the plurality of Y-shaped anchors on the backing surface, and wherein none of the plurality of Y-shaped anchors touch another of the plurality Y-shaped anchors.

7. The process of claim 6, wherein during the welding process, the Y-shaped anchor is held by a stud gun.

8. The process of claim 6, wherein the triangular section includes a flattened edge that is pressed into the backing plate, the stud gun releases an electric charge that melts a part of the triangular section forming the weld joint between the anchor and the backing surface.

9. The process of claim 6, wherein the plurality of installed Y-shaped anchors do not touch each other on the backing surface.

10. The process of claim 6, wherein a disposable ceramic ferrule is used in the stud welding step.

11. The process of claim 6, further comprising applying a refractory material to the plurality of Y-shaped anchors that is about one inch thick.

12. The process of claim 6, wherein the backing surface is the interior of a fluid catalytic cracking unit.

\* \* \* \* \*